United States Patent [19]
Richardson

[11] Patent Number: 5,836,698
[45] Date of Patent: Nov. 17, 1998

[54] APPARATUS AND METHOD FOR REMOVAL AND INSTALLATION OF A STRUT BEARING

[75] Inventor: Warner G. Richardson, Shorewood, Ill.

[73] Assignee: Caterpillar Inc., Peoria, Ill.

[21] Appl. No.: 926,365

[22] Filed: Sep. 9, 1997

[51] Int. Cl.⁶ .............................. F16C 29/02; F16C 43/02
[52] U.S. Cl. .......................... 384/29; 384/295; 29/898.08
[58] Field of Search ................. 29/898.08, 724; 384/29, 41, 275, 281, 295, 296, 906

[56] References Cited

U.S. PATENT DOCUMENTS

| | | | |
|---|---|---|---|
| Re. 32,764 | 10/1988 | Smith et al. ............................... | 384/275 |
| 648,204 | 4/1900 | Harris ........................................ | 384/281 |
| 2,635,015 | 4/1953 | Babb ......................................... | 384/441 |
| 3,317,254 | 5/1967 | Satterthwaite et al. ................ | 29/724 X |
| 4,472,150 | 9/1984 | Tang ..................................... | 384/281 X |
| 4,585,359 | 4/1986 | Kramer ...................................... | 384/98 |
| 4,710,142 | 12/1987 | Lovell ........................................ | 440/83 |
| 4,726,267 | 2/1988 | Brinkmann et al. ................... | 384/29 X |
| 4,734,009 | 3/1988 | Campbell et al. ........................ | 415/170 |
| 4,764,035 | 8/1988 | Boyd ......................................... | 384/152 |
| 4,989,998 | 2/1991 | Willis et al. .............................. | 384/275 |
| 5,007,235 | 4/1991 | Nickel et al. ........................ | 384/281 X |
| 5,288,153 | 2/1994 | Gardner .................................... | 384/311 |
| 5,520,466 | 5/1996 | Everitt et al. ............................ | 384/294 |
| 5,529,399 | 6/1996 | Holze ....................................... | 384/107 |

Primary Examiner—Thomas R. Hannon
Attorney, Agent, or Firm—Calvin E. Glastetter

[57] ABSTRACT

Struts are useful for improving the suspension of a machine wherein a rod is reciprocating mounted within a housing. A bearing is positioned within the housing to improve the sliding motion of the rod and to reduce wear. The subject apparatus is used for removing and installing the bearing without removing the strut from the machine. The strut includes a multi-piece bearing which is positioned around the rod to form a circular bearing. An end cap is positioned around the rod and a key connects the end cap to the bearing so that the components can be removed and installed as an assembly.

6 Claims, 4 Drawing Sheets

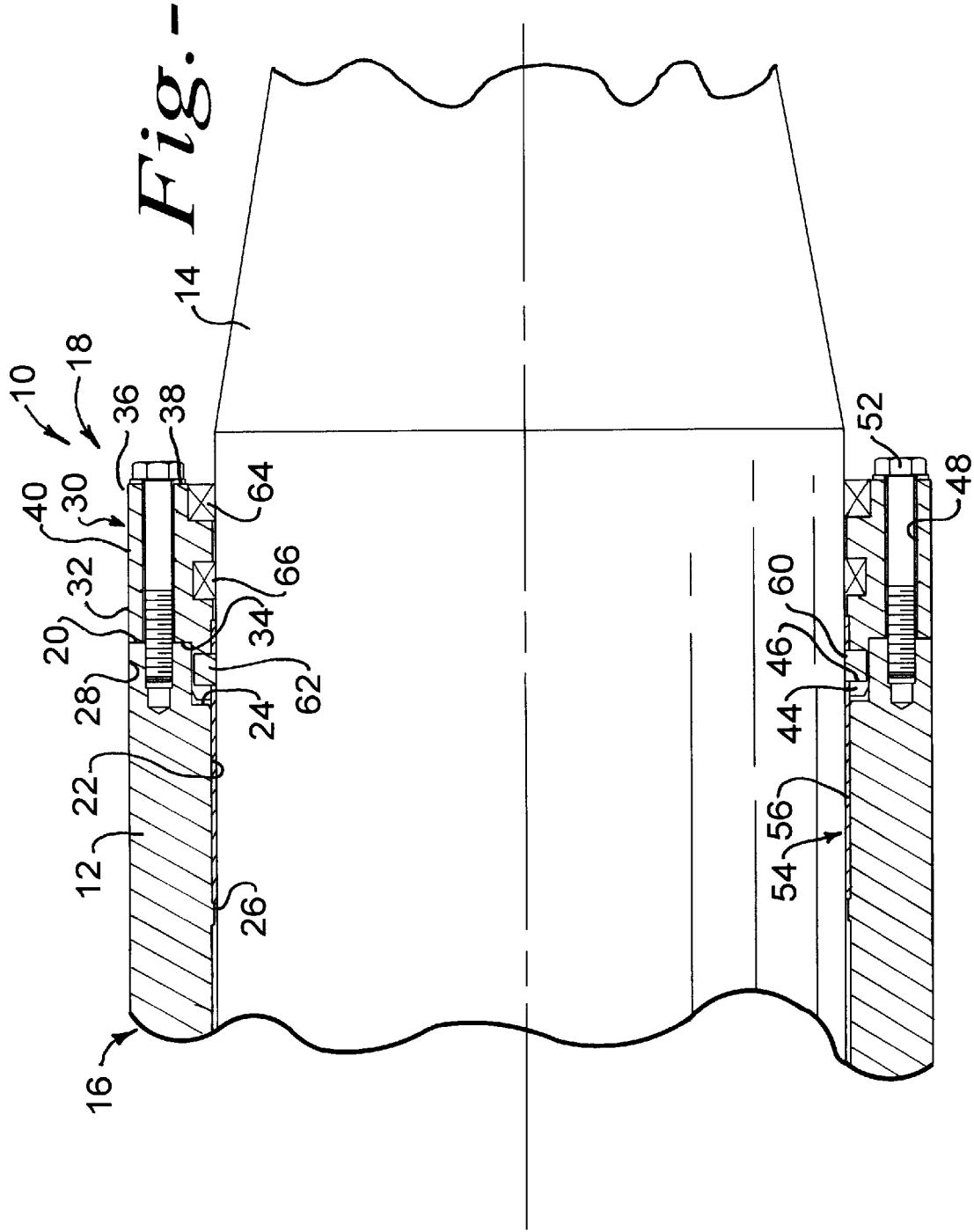

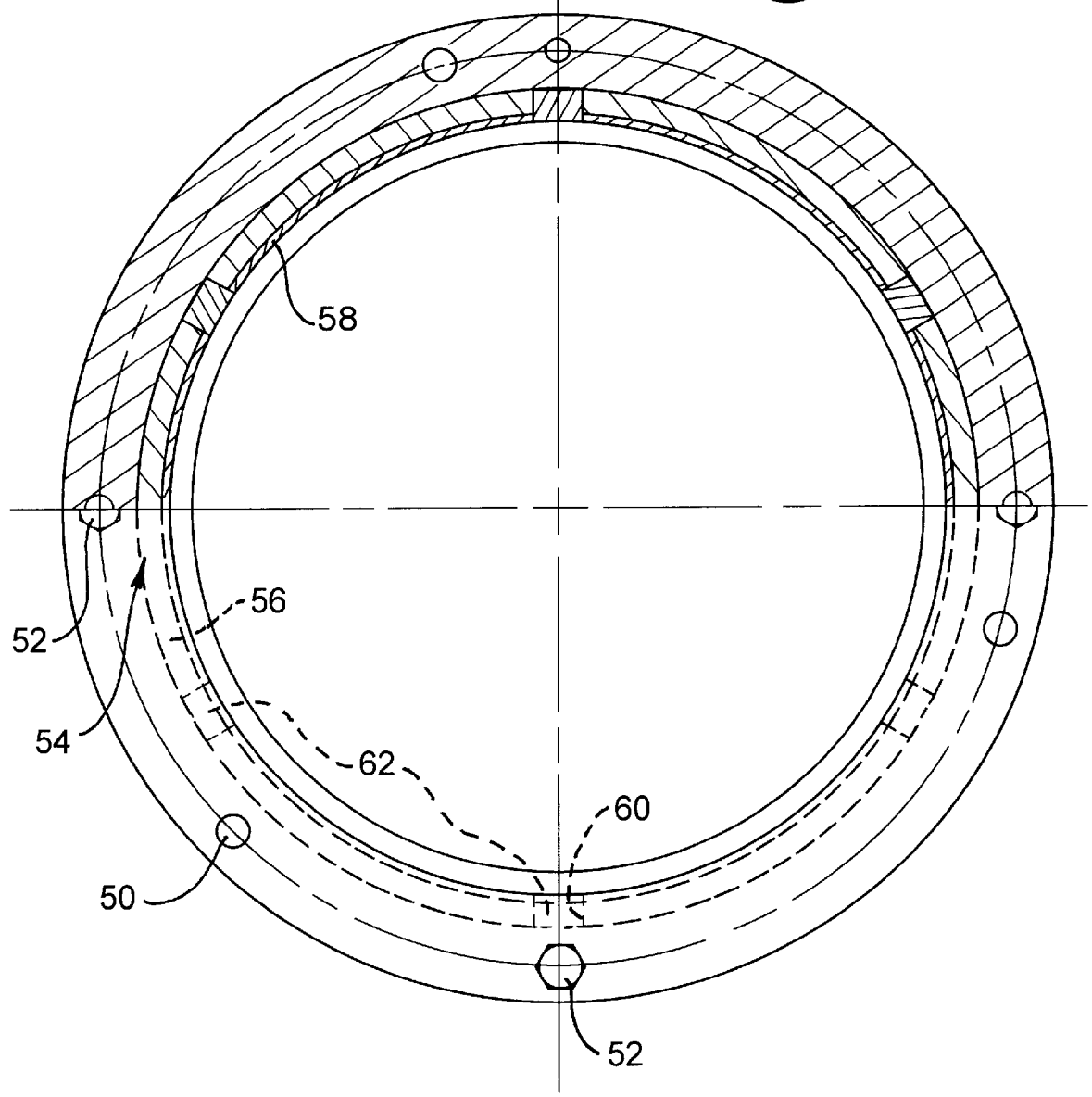
Fig. -2 -

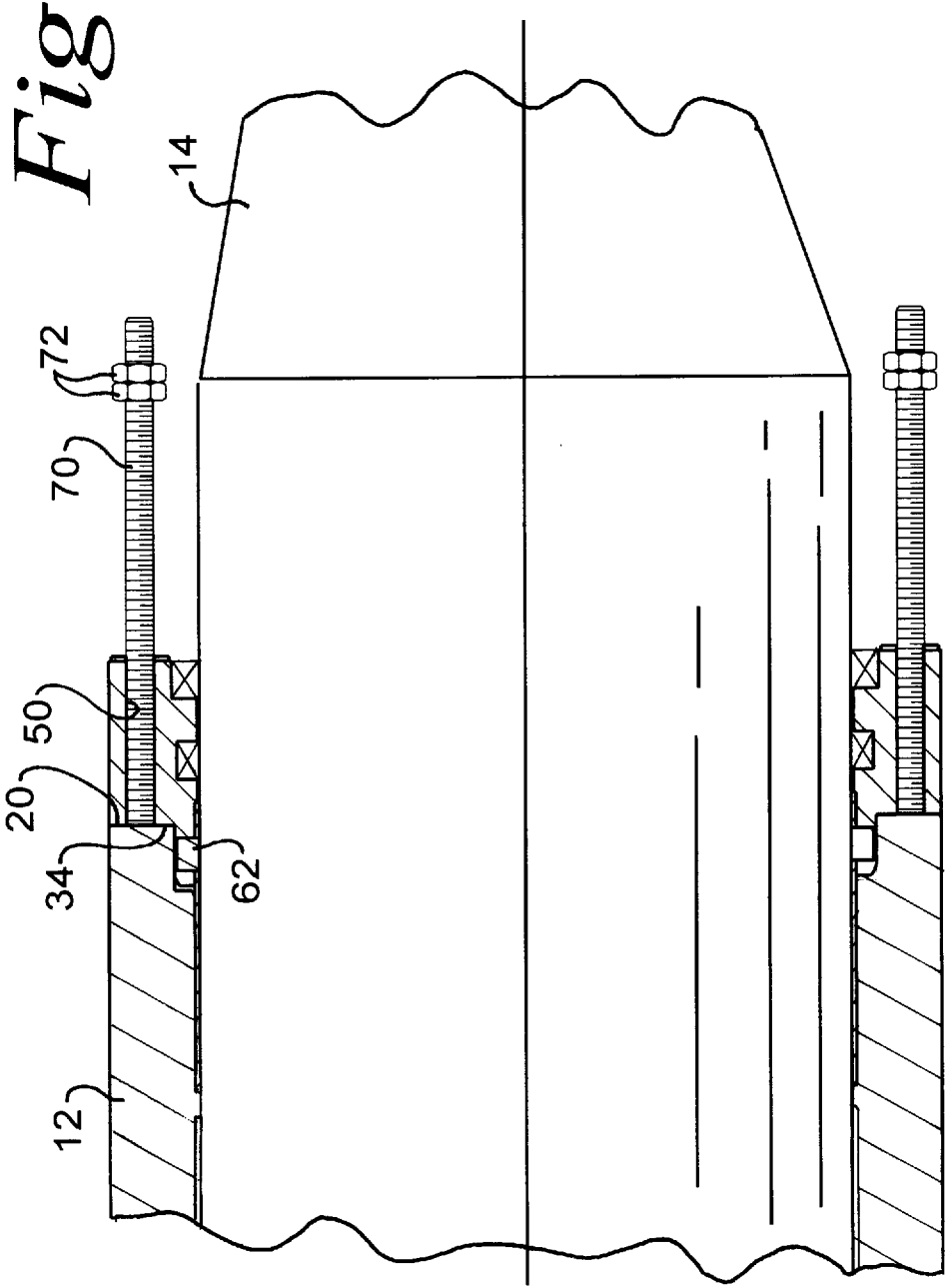
Fig.- 3 -

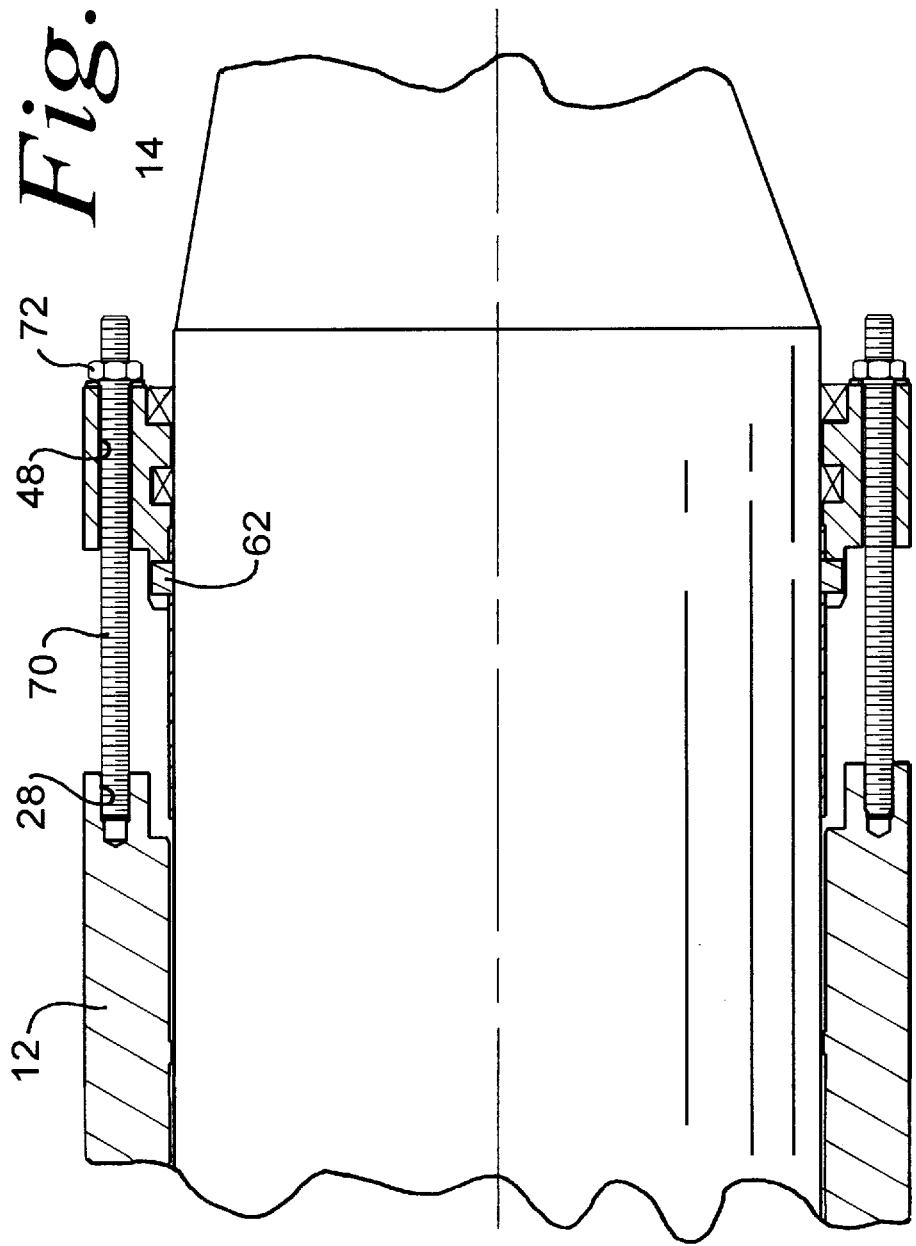

APPARATUS AND METHOD FOR REMOVAL AND INSTALLATION OF A STRUT BEARING

TECHNICAL FIELD

This invention relates to a suspension strut of a machine and more particularly to an apparatus for removing and installing a rod bearing without removing the strut from the machine.

BACKGROUND ART

Large machines, such as off highway trucks, have suspension struts which are also used as a kingpin arrangement for mounting a rim and tire on the machine. Currently, the suspension strut is designed such that the rod bearing in the strut can only be serviced when the entire strut is removed from the machine and the rod must be removed from the strut housing. One of the problems when removing the suspension strut from the machine results in a large amount of down time for the machine. It would be beneficial to have a suspension strut which has a bearing which can be serviced without removing the strut from the machine.

The present invention is directed to overcoming one or more of the problems as set forth above.

DISCLOSURE OF THE INVENTION

In one aspect of the present invention a suspension strut includes a cylindrical housing having a bore therein. A cylindrical rod is reciprocating mounted within the strut housing. A multi-piece bearing is positioned within the bore between the housing and the rod. The multi-pieces form a circular bearing, each piece has an end portion having a hole therethrough. An end cap is removeably attached to the housing around the rod. The end cap has an end portion positioned between the housing and the bearing. The end cap has a hole aligned with the hole in the bearing. A key is positioned in the hole of the bearing and the hole in the end cap for connecting the bearing to the end cap.

The present invention provides a strut having a bearing arrangement which can be removed and installed without removing the strut from the machine.

BRIEF DESCRIPTION OF THE DRAWINGS

FIG. 1 is a diagrammatic illustration of the present invention with components in position for normal use.

FIG. 2 is a end view of the strut.

FIG. 3 is a diagrammatic illustration with components in position for disassembly.

FIG. 4 is a diagrammatic illustration with the bearing removed from the strut.

BEST MODE FOR CARRYING OUT THE INVENTION

Referring to FIGS. 1 and 2, a strut 10 for the suspension of a machine, such as a large truck, not shown, is provided. The strut 10 includes a cylindrical housing 12 and a cylindrical rod 14 reciprocating mounted within the housing 12. The housing 12 has a first end portion 16 which is attached to the machine and a second end portion 18 having a mounting surface 20. A stepped bore 22 within the housing 12 extends from the mounting surface 20 toward the first end potion 16 for reciprocating receiving the rod 14. The stepped bore 22 has an annular enlarged diameter portion 24 which extends a predetermined distance from the mounting surface into the housing 12. A reduced diameter annular shoulder 26 of the bore 22 is positioned a predetermined distance from the mounting surface 20. A plurality of threaded holes 28 in the housing 12 extend a predetermined distance from the mounting surface 20 toward the first end portion 16. The threaded holes 28 equally spaced around the mounting surface.

A circular end cap 30 has a first end portion 32 having a mounting surface 34 for contacting the mounting surface 20 on the housing 12, a second end portion 36 having an end surface 38 and a center portion 40 having an annular shoulder 42. The first end portion 32 has an axial projection 44 having a plurality of equally spaced radial holes 46. A plurality of mounting holes 48 extend between the mounting surface 34 and the end surface 38. The plurality of holes 48 are equally spaced around the end cap 30. The spacing of the holes 48 match the spacing of the threaded holes 28 around the mounting surface of the housing. A plurality of threaded puller holes 50 extend between the mounting surface 34 and the end surface 38. The puller holes are equally spaced around the cap end 30. A plurality of bolts 52 extend through the mounting holes 48 and are threadably tightened into the threaded holes 28 of the housing 12.

A bearing member 54 is positioned within the bore 22 of the housing 12. The bearing member 54 is composed of multi-pieces positioned to form a circular bearing around the rod 14. As shown in FIG. 2, the bearing member 54 includes a first semi-circular bearing piece 56 and a second semi-circular bearing piece 58. The bearing member 54 includes a plurality of equally spaced radial holes 60. The radial holes 60 in the bearing member 54 are aligned with the radial holes 46 in the end cap 30. The bearing member 54 axially extends between the shoulder 26 on the housing and the shoulder 42 on the end cap.

A plurality of keys 62 are positioned in the aligned holes 46,60 to connect the end cap 30 and the bearing member 54 together so that they can be removed and installed as an assembly.

A first seal 64 and a second seal 66 are positioned in the end cap 30 to prevent dirt from entering the bore 22 of the strut 10.

Referring to FIGS. 3 and 4, a plurality of elongated threaded rods 70 are provided for removing or installing the end cap 30 on the housing. Each of the threaded rods 70 includes one or more nuts 72 which are used to interact with the threaded rod 70 during installation or removal of the end cap 30. In FIG. 3 the rod 70 interact the plurality of threaded puller holes in the end cap to remove the end cap and the bearing. In FIG. 4 the rod is threaded into the holes 28 in the housing to install the end cap and the bearing.

Industrial Applicability

In the use of the suspension strut 10 of the present invention when the bearing member 54 needs to be serviced the bolts 52 are removed from the mounting holes 48 in the end cap 30. The rod 70 is threaded into the puller hole 50 until it contacts the surface 20. Any suitable means, for example a wrench, is used on the double nuts 72 to turn the rod. With the rod 70 in contact with the surface 20 continued rotating of the rod will move the end cap 30 up the rod away from the housing 12. The end cap 30, the key 62 and the bearing 54 are all moved away from the housing 12. Continued rotating of the rod 70 pulls the bearing 54 out from the bore 22. After the bearing is removed from the bore 22 the key 62 is removed from the holes 46,60 in the bearing 54 and the end cap 30 to separate the components. The used or old bearing pieces are discarded and the new semi-circular bearing pieces 56,58 are positioned around the rod 14 to form the circular bearing 54. The rod 70 is now threaded into the threaded hole 28 in the housing 12. The end cap 30 is positioned around the rod 14 so that the rod 70 extends through the mounting hole 48 in the end cap 30. The key 62 is again positioned in the aligned holes 46,60 of the end cap 30 and the bearing 54. The nut 72 is than threaded on the rod 70 to contact the end cap 30. Continued rotating of the nut 72 moves the end cap 30, the bearing 54, and the key 62, as an assembly, down the rod 70 toward the housing 12. As the nut 22 is rotated the bearing is pushed into the bore 22 of the housing 12 to be positioned between the housing 12 and the rod 14. When the end cap is in the proper position the rod 70 is removed and the bolt 52 is inserted in the mounting hole 48 and is threaded into the hole 28 of the housing 12 to complete the installation.

In view of the foregoing, it is readily apparent that the structure of the present invention provides a bearing arrangement for a suspension strut which can be replaced without removing the strut from the machine.

Other aspects, objects and advantages of this invention can be obtained from a study of the drawings, the disclosure and the appended claims.

I claim:

1. A suspension strut having a cylindrical housing with a bore therein and a cylindrical rod reciprocating mounted within the bore of the strut housing, comprising:

a multi-piece bearing positioned within the bore between the cylindrical housing and the cylindrical rod, the multi-pieces form a circular bearing around the rod, each of the pieces have an end portion having a hole therethrough;

a end cap removeably attached to the cylindrical housing around the rod, the end cap having a end portion positioned between the housing and the bearing and having a hole aligned with the hole in the bearing; and a key positioned in the hole of the bearing and the hole in the end cap for connecting the bearing to the end cap.

2. The suspension strut of claim 1, wherein the multi-piece bearing includes a first semi-circular bearing piece and a second semi-circular piece.

3. The suspension strut of claim 1, wherein the housing includes a end surface having a plurality of threaded holes equally spaced therein.

4. The suspension strut of claim 3, wherein the end cap includes a plurality of mounting holes aligned with the threaded holes in the housing.

5. The suspension strut of claim 4 wherein the end cap includes a plurality of threaded puller holes equally spaced therein.

6. A method for installing and removing a bearing which is positioned between a cylindrical housing and a rod in a suspension strut, comprising the steps of:

removing a bolt that extends through a mounting hole in a end cap and is threadably fastened into the housing for unfastening the end cap from the housing;

rotating an elongated threaded rod into a threaded puller hole for removing the end cap and the bearing from the strut;

disconnecting the bearing from the end cap for removal of the bearing;

connecting the bearing to the end cap for installing the bearing;

rotating the elongated rod into a threaded hole in the housing;

rotating a nut onto the threaded rod to contact the end cap and moving the end cap and the bearing into position in the housing;

removing the threaded rod from the threaded hole in the housing; and positioning the bolt in the mounting hole in the end cap and rotating the bolt into the threaded hole in the housing to fasten the end cap to the housing.

* * * * *